(12) United States Patent
Rivera Negron

(10) Patent No.: US 8,231,131 B1
(45) Date of Patent: Jul. 31, 2012

(54) STAIRCASE MOVABLE CART

(76) Inventor: Leonardo Rivera Negron, Trujillo Alto, PR (US)

( * ) Notice: Subject to any disclaimer, the term of this patent is extended or adjusted under 35 U.S.C. 154(b) by 364 days.

(21) Appl. No.: 12/554,972

(22) Filed: Sep. 7, 2009

(51) Int. Cl.
*B62B 5/02* (2006.01)
(52) U.S. Cl. .......... 280/5.28; 280/5.2; 280/638
(58) Field of Classification Search .......... 280/638, 280/DIG. 10, 5.2, 5.28, 5.32
See application file for complete search history.

(56) References Cited

U.S. PATENT DOCUMENTS

| | | | | |
|---|---|---|---|---|
| 1,885,112 A | * | 11/1932 | Jankisz | 280/5.3 |
| 2,513,440 A | * | 7/1950 | Alderson | 280/35 |
| 2,981,546 A | * | 4/1961 | Letourneur | 280/5.28 |
| 3,411,798 A | * | 11/1968 | Capadalis | 280/5.32 |
| 3,836,160 A | * | 9/1974 | Linsley | 280/5.32 |
| 3,893,679 A | * | 7/1975 | Sumrall | 280/5.3 |
| 4,185,846 A | * | 1/1980 | Black | 280/32.6 |
| 4,249,749 A | * | 2/1981 | Collier | 280/35 |
| 4,310,166 A | * | 1/1982 | Eicher | 280/5.28 |
| 4,722,538 A | * | 2/1988 | Freyman | 280/5.32 |
| 5,096,265 A | * | 3/1992 | Chang | 301/111.06 |
| 7,389,996 B2 | * | 6/2008 | Dube et al. | 280/35 |
| 2003/0098552 A1 | * | 5/2003 | Hsiao | 280/5.24 |

* cited by examiner

*Primary Examiner* — Katy M Ebner

(57) ABSTRACT

A cart that can be used as a hand truck for carrying heavy loads up and down a staircase is disclosed. The design has means for accommodating in any size of staircase steps and the small compact dimensions of the cart make it useful for around the corner maneuvering. The cart is divided into two parts that separates while doing the movements to step up or down thru the stairways then it unites together to repeat the cycle. Square rods on the side's holds and support the two parts of the cart and give strength to hold the heavy loads. It uses expansions springs to hold the two parts of the cart and it used to repeat the movements as its stretches away and snaps together.

7 Claims, 3 Drawing Sheets

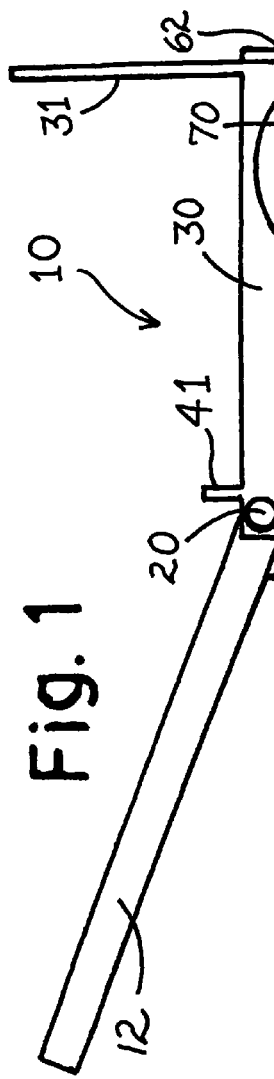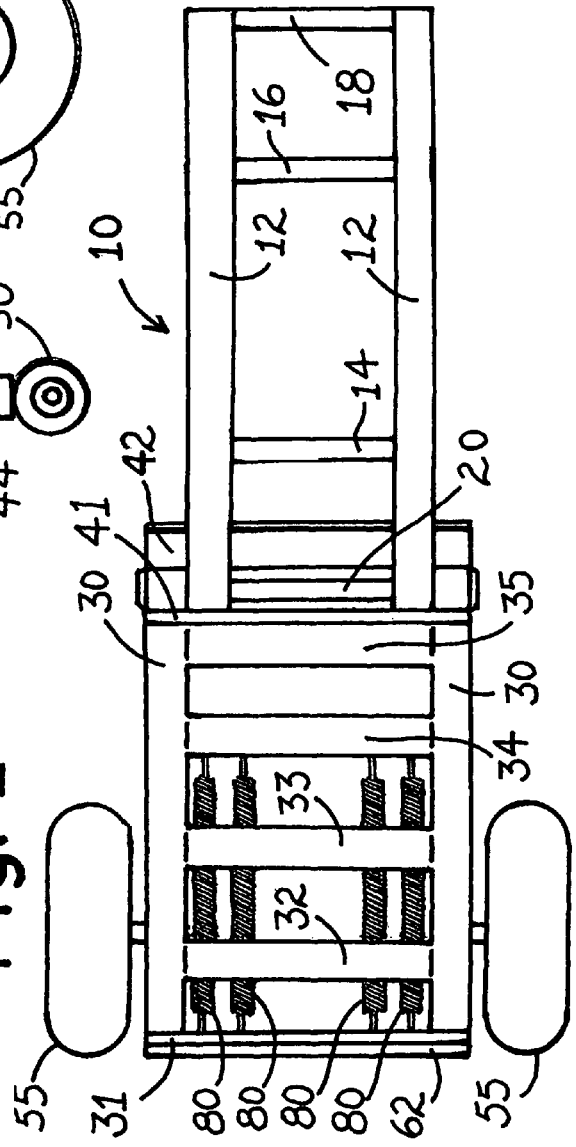

STAIRCASE MOVABLE CART

BACKGROUND OF THE INVENTION

The present invention relates to a cart that can be used as a hand truck, designed for carrying and pulling heavy loads and more particularly, with means to move heavy replacement equipment or parts up and down a flight of stairs. A main problem for a technician working in the field of refrigeration and air conditioning is the time consumed when replacing heavy air conditioning compressors that weight from 300 to almost 500 pounds from air conditioning systems classified from 100 tons or more cooling capacity that uses compressors from 10 to 25 hp, because of the need for a transport crane vehicle to bring up to the roof the new compressor taking too much time from calling the crane to the arriving to the building. Thus, the cart offers a handy tool for carrying and pulling heavy loads up or down a flight of stairs in an emergency situation that requires replacement parts like compressors.

A problem with prior art hand trucks or carrying carts is that it is difficult for the operator to manage the front or main wheels because they tend to get stuck in front of the bottom step of the staircase when lifting something heavy upstairs, making the person pulling the load to overcome the resistant or weight. Thus, there is a need for a simplified cart, which is adapted to move easily up or down a night of stairs.

Another problem with existing carts or hand truck for climbing staircase is that they use electric motors that depend mostly on the energy consumption to maintain the device in optimum functionality while the demand with amperage work to deliver the load several floors up is required to last longer. The invention herein seeks to solve the problem.

Another problem with existing hand trucks and carrying carts is their limited move ability for transporting heavy loads around a building or the like, their dimensions are very large and their capabilities are for very open areas. The personnel needed to accomplish the lifting and pulling of the load would require always that there must be too much space for maneuvering. Thus, there has been a need for carrying cart which is small constructed to enable an operator to handle heavy loads around a building.

The invention herein seeks to solve the problem of the prior arts by means of a cart that can be used as a hand truck, which is capable of transporting heavy loads up and down a flight of stairs. The cart herein may be manufactured inexpensively, and is designed to carry heavy loads without any limitation of movement space. Thus, the present invention effectively eliminates the problem of the prior art.

SUMMARY OF THE INVENTION

The invention herein contemplates a cart that can be used as a hand truck or carrying device comprising a handle attached to a horizontal frame composed of a pair of laterally square rods having a hollow inside attached to another pair of laterally square rods that fits inside said the first pair of square rods secured together by cross members and a feet portion to form a rest for supporting a load when used as a hand truck. Two small square rods legs extending downwardly with two swiveling wheels that can move in all directions support the front side of the cart and are used as handles when the cart is used as a hand truck. At the backside, there two angular shape square rods legs extending downwardly with two larger wheels mounted on a transverse axle secured between the two said angular shape legs.

An important feature of the invention is four expansion springs attached between a front side angular material to a backside rectangular plate of the cart. These springs are responsible for the cycling movement performed to go up or down a flight of stairs and for holding the front side of the cart with the back side of the cart.

When the cart is used, a person will raise the front wheels using the handle onto the stairs, thus, putting the larger wheels in front of the stairs. While the load is pulled upward, the front side will separate from the backside, causing the springs to stretch and the inside rods to pull away from the outside rods, thereby separating the front side from the backside. The smaller wheels of the front side will course a larger distance than the backside wheels, causing with the handle, a pole that will ease the lifting of the load. The springs would then pull the backside of the cart to unite to the front side in a snapping action, making ready the cart to repeat the cycle very fast.

While descending stairs, a person holding and controlling the front side of the cart as a pole where the load is resting would let the backside of the cart fall so that the big wheels will descend automatically and slowly by the force of gravity of the weight on the front side that will cause the expansion springs to expand, thus separating the back side and then the front side using the outer square rods to descend slowly thru the inner square rods of the back side of the cart and completing the cycle. Thus, the cart offers a means for proper functionality for going up or down a stairs with a simple and compact design. A more explanatory description and functionality of the present invention will be fully appreciated on the next detailed description of the invention and the appended claims.

BRIEF DESCRIPTION OF THE DRAWINGS

FIG. 1 is a side view of the cart according to the present invention.

FIG. 2 is a front elevation view of the cart according to the present invention.

DETAILED DESCRIPTION OF THE INVENTION

Figure 3:
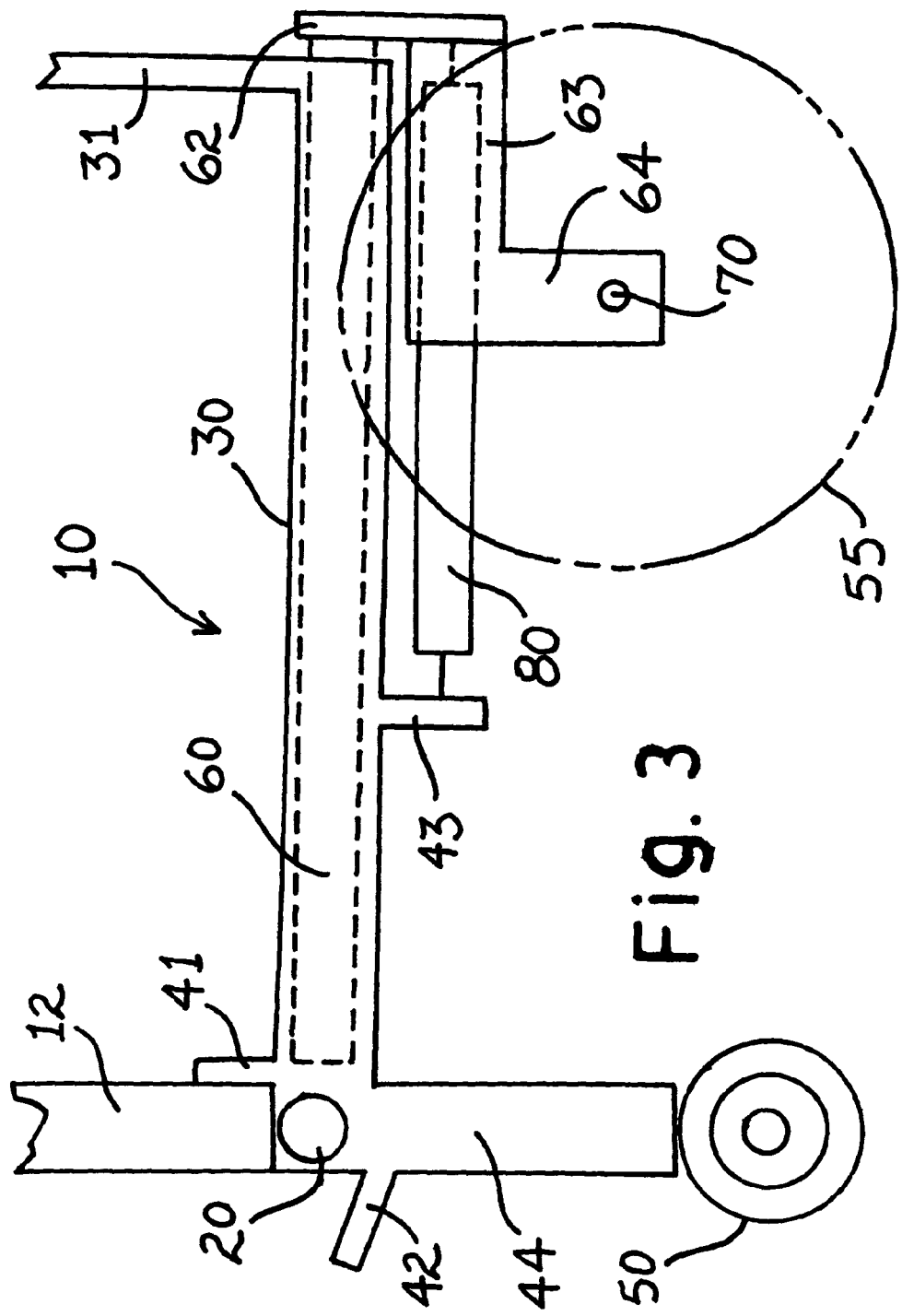
FIG. 3 is a side cross-sectional view of the cart according to the present invention.

FIG. 1 and FIG. 2 illustrates the cart that can be used as a hand truck device which is intended for carrying heavy loads and which is adapted to move the heavy loads easily up and down a flight of stairs.

A cart 10 comprises a rectangular shape handle 12 composed of two long square rods attached in the middle by three round tubes 14, 16, and 18 and secured at the front side of the cart by a solid round axle 20 at the back extreme of the handle.

The front side of the cart is a rectangular shape with two long square rods 30 in the sides crossed by plates 32, 33, 35 and angular 34, where the load would rest, and a big rectangular plate 31 at the back extreme where the cart can work as a hand truck as the load is picked up here when holding the two front square rods downwardly extending legs portions 44 where the two swiveling wheels 50 at one extreme are abdicated. In the front extreme of the front side of the cart, there two holes where the front axle 20 for holding the handle and the front side of the cart is inserted. In the front extreme of the front side of the cart there is one stopper 41 with a 90-degree position and another stopper 42 with an 80-degree position crossing horizontally between the two square rods 30.

The backside of the cart comprises two parallel long square rods 60 held in the back portion extreme by a rectangular plate 62 where two angular shape square rods 63 and 64, in downwardly positions, extend to form two legs where an axle 70 mounts transversally the two big back wheels 66. Four expansion springs 80 are attached and secured between angular 34 of the front side of the cart and plate 62 of the backside of the cart by holes in the angular 43 and holes in the plate 62 and attached with nuts.

Figure 4:
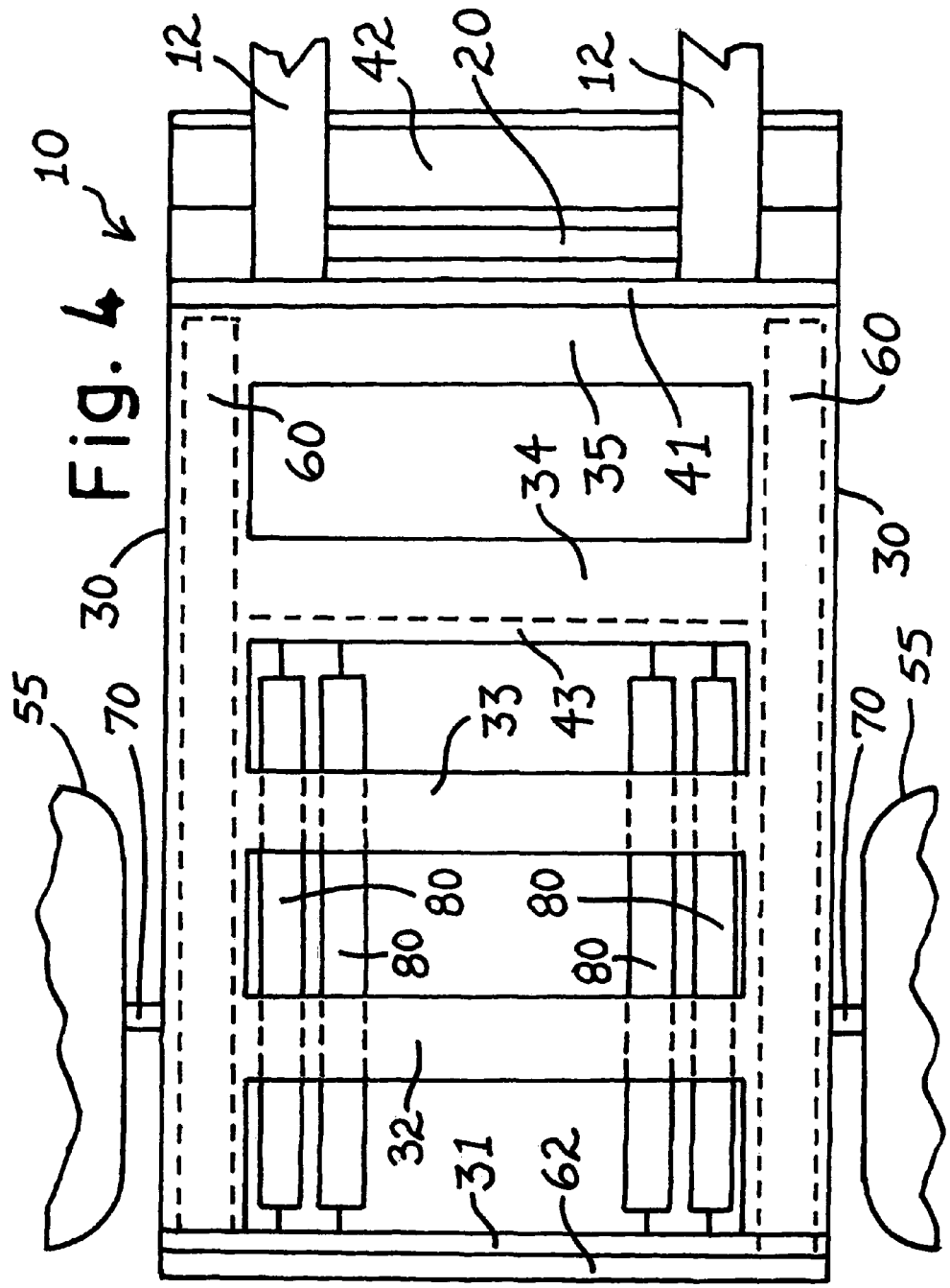
FIG. 4 is a front elevation cross-sectional view of the cart according to the present invention.

Referring to FIG. 3 and FIG. 4, the invention works when a person having the cart in a horizontal position, resting in his four wheels 50 and 66 and having a heavy load on top of plates 32, 33, 35 and angular 34 crossed and supported with square rods 30 and 60 and plate 31, are moved in position to climb or descend a flight of stairs with handle 12 that is limited by stoppers 41 and 42 that can tilt in an arc swing by 90-degrees maximum to the front side of the person and a maximum of 80-degrees down the position of the person with axle 20. When ascending a flight of stairs, a person will raise and place in the stairs the front wheels 50 until the back wheels 66 touch the stairs. Then as the person pulls more upward the expansion springs 80 will stretch away, separating the outside square rods 30 from the inside square rods 60, thereby separating the front side of the cart, where the loads are, from the backside of the cart, where the two big back wheels are still anchored in the stairs in a holding position. Then using stopper 42, the handle 12 is tilted from axle 20 a little bit down so wheels 55 are levered up and the expansion springs 80 do the work necessary to pull the back side of the cart up the stairs and make it easier for the person pulling the cart.

When descending the stairs, a person, while holding the handle 12 and controlling the descent with the back side of the cart, will let the back wheels 55 fall first and using the weight of the load to cause the wheels 55 to roll back more and the expansion springs 80 stretches, separating the inner square rods 60 from the outer square rods 30, thus separating the back side of the cart with the front side, still the person controlling the descent of the front side of the cart, where the load, is will let the outer square rods 30 slide back to square rods 60, thus uniting again the front side of the cart with the back side.

While ascending and descending heavy loads thru a flight of stairs using the combination of the handle 12 and the front legs 44 and using stopper 42 would function as a pole for overcoming weight resistance from the load as strength is given for the person controlling the cart. It will be apparent to those skilled in the art that the foregoing disclosure is exemplary in nature, rather than limiting, the invention being limited only by the appended claims.

I claim:

1. A cart comprising:
   a platform formed from first and second platform rods interconnected with a plurality of plates;
   a handle pivotably mounted on a first end of the platform;
   an end plate extending orthogonally from a second, opposite end of the platform;
   a leg portion extending from the platform in a direction opposite that of the end plate;
   first and second extension rods adapted to fit inside the first and second platform rods, the first and second extension rods adapted to extend from the second, opposite end of the platform;
   an angular member extending between the first and second platform rods, the angular member extending in a direction opposite that of the end plate;
   an extension rod plate attached between the first and second extension rods, the extension rod plate extending in a direction opposite that of the end plate;
   first and second wheels operationally connected to the first and second extension rods; and
   a plurality of springs disposed between the angular member and the extension rod plate, the plurality of springs adapted to resiliently secure the first and second extension rods into the first and second platform rods.

2. The cart of claim 1, wherein the plurality of springs is four springs.

3. The cart of claim 1, further comprising a swivel wheel at a distal end of the leg portion.

4. The cart of claim 1, wherein the leg portion includes first and second leg portions attached to the first and second platform rods respectively.

5. The cart of claim 4, further comprising a swivel wheel at a distal end of each of the first and second leg portions.

6. The cart of claim 1, further comprising a first handle stopper extending orthogonally from the platform, the first handle stopper adapted to limit pivot of the handle.

7. The cart of claim 1, further comprising a second handle stopper extending at an 80 degree angle from the leg portion, the second handle stopper adapted to limit pivot of the handle.

\* \* \* \* \*